(12) United States Patent
Meng et al.

(10) Patent No.: US 10,483,806 B2
(45) Date of Patent: *Nov. 19, 2019

(54) MULTI-MODE ENERGY RECEIVER SYSTEM

(71) Applicant: POWERSPHYR INC., Danville, CA (US)

(72) Inventors: David F. Meng, San Ramon, CA (US); William B. Wright, Boca Raton, FL (US)

(73) Assignee: PowerSphyr Inc., Danville, CA (US)

( * ) Notice: Subject to any disclaimer, the term of this patent is extended or adjusted under 35 U.S.C. 154(b) by 108 days.

This patent is subject to a terminal disclaimer.

(21) Appl. No.: 15/786,506

(22) Filed: Oct. 17, 2017

(65) Prior Publication Data

US 2018/0109147 A1    Apr. 19, 2018

Related U.S. Application Data

(60) Provisional application No. 62/409,802, filed on Oct. 18, 2016, provisional application No. 62/409,806, filed on Oct. 18, 2016, provisional application No. 62/409,811, filed on Oct. 18, 2016.

(51) Int. Cl.
*H02J 50/12* (2016.01)
*H02J 7/02* (2016.01)
(Continued)

(52) U.S. Cl.
CPC .............. *H02J 50/12* (2016.02); *H02J 7/025* (2013.01); *H02J 7/027* (2013.01); *H02J 50/10* (2016.02);
(Continued)

(58) Field of Classification Search
CPC .. H02J 50/12; H02J 50/90; H02J 50/10; H02J 50/23; H02J 7/025; H02J 7/0027; H04B 5/0037; H04B 5/0075; H04B 5/0093; H01Q 3/04; H01Q 7/00; H01Q 9/30; H01Q 9/42; H01Q 9/10; H02M 1/12
See application file for complete search history.

(56) References Cited

U.S. PATENT DOCUMENTS

| 6,289,237 B1 | 9/2001 | Mickle et al. |
| 6,615,074 B2 | 9/2003 | Mickle et al. |

(Continued)

FOREIGN PATENT DOCUMENTS

| EP | 2387127 A2 | 11/2011 |
| EP | 2579424 A2 | 4/2013 |

(Continued)

OTHER PUBLICATIONS

Jorgesen et al., "Balun Basics Primer: A Tutorial on Baluns, Balun Transfromers, Magic-Ts, and 180° Hybrids," Marki Microwave, Inc, 2014, 12 pages.

(Continued)

*Primary Examiner* — Robert L Deberadinis
(74) *Attorney, Agent, or Firm* — Knobbe, Martens, Olson & Bear, LLP

(57) ABSTRACT

A device is provided that includes a processor configured to identify a power transferring device and to determine a range configuration relative to the power transferring device, and to determine a power status of the device. The device also includes a first antenna configured to receive an oscillating power signal from the power transferring device at a first selected frequency based on the range configuration relative to the power transferring device, and on the power status of the device, and a first rectifier circuit configured to convert the oscillating power signal from the first antenna at the first selected frequency into a direct-current signal to charge a device load. A method for using the above device is also provided.

20 Claims, 10 Drawing Sheets

(51) Int. Cl.
*H04B 5/00* (2006.01)
*H02J 50/10* (2016.01)
*H02J 50/90* (2016.01)
*H02J 50/23* (2016.01)
*H02M 1/12* (2006.01)
*H01Q 3/04* (2006.01)
*H01Q 7/00* (2006.01)
*H01Q 9/30* (2006.01)
*H01Q 9/42* (2006.01)
*H01Q 19/10* (2006.01)

(52) U.S. Cl.
CPC .............. *H02J 50/23* (2016.02); *H02J 50/90* (2016.02); *H04B 5/0037* (2013.01); *H04B 5/0075* (2013.01); *H04B 5/0093* (2013.01); *H01Q 3/04* (2013.01); *H01Q 7/00* (2013.01); *H01Q 9/30* (2013.01); *H01Q 9/42* (2013.01); *H01Q 19/10* (2013.01); *H02M 1/12* (2013.01)

(56) References Cited

U.S. PATENT DOCUMENTS

| | | |
|---|---|---|
| 6,856,291 B2 | 2/2005 | Mickle et al. |
| 6,886,685 B2 | 5/2005 | Slater |
| 7,027,311 B2 | 4/2006 | Vanderelli et al. |
| 7,057,514 B2 | 6/2006 | Mickle et al. |
| 7,639,994 B2 | 12/2009 | Greene et al. |
| 7,643,312 B2 | 1/2010 | Vanderelli et al. |
| 7,741,734 B2 | 6/2010 | Joannopoulos et al. |
| 7,812,771 B2 | 10/2010 | Greene et al. |
| 7,825,543 B2 | 11/2010 | Karalis et al. |
| 7,844,306 B2 | 11/2010 | Shearer et al. |
| 7,868,482 B2 | 1/2011 | Greene et al. |
| 7,898,105 B2 | 3/2011 | Greene et al. |
| D636,333 S | 4/2011 | Kulikowski |
| 7,925,308 B2 | 4/2011 | Greene et al. |
| 8,022,576 B2 | 9/2011 | Joannopoulos et al. |
| 8,035,255 B2 | 10/2011 | Kurs et al. |
| 8,076,800 B2 | 12/2011 | Joannopoulos et al. |
| 8,076,801 B2 | 12/2011 | Karalis et al. |
| 8,084,889 B2 | 12/2011 | Joannopoulos et al. |
| 8,097,983 B2 | 1/2012 | Karalis et al. |
| 8,115,448 B2 | 2/2012 | John |
| 8,159,090 B2 | 4/2012 | Greene et al. |
| 8,159,364 B2 | 4/2012 | Zeine |
| 8,304,935 B2 | 11/2012 | Karalis et al. |
| 8,324,759 B2 | 12/2012 | Karalis et al. |
| 8,362,651 B2 | 1/2013 | Haman et al. |
| 8,378,522 B2 | 2/2013 | Cook et al. |
| 8,395,282 B2 | 3/2013 | Joannopoulos et al. |
| 8,395,283 B2 | 3/2013 | Joannopoulos et al. |
| 8,400,017 B2 | 3/2013 | Kurs et al. |
| 8,400,018 B2 | 3/2013 | Joannopoulos et al. |
| 8,400,019 B2 | 3/2013 | Joannopoulos et al. |
| 8,400,020 B2 | 3/2013 | Joannopoulos et al. |
| 8,400,021 B2 | 3/2013 | Joannopoulos et al. |
| 8,400,022 B2 | 3/2013 | Joannopoulos et al. |
| 8,400,023 B2 | 3/2013 | Joannopoulos et al. |
| 8,400,024 B2 | 3/2013 | Joannopoulos et al. |
| 8,410,636 B2 | 4/2013 | Kurs et al. |
| 8,410,953 B2 | 4/2013 | Zeine |
| 8,432,062 B2 | 4/2013 | Greene et al. |
| 8,441,154 B2 | 5/2013 | Karalis et al. |
| 8,446,248 B2 | 5/2013 | Zeine |
| 8,461,719 B2 | 6/2013 | Kesler et al. |
| 8,461,720 B2 | 6/2013 | Kurs et al. |
| 8,461,721 B2 | 6/2013 | Karalis et al. |
| 8,461,722 B2 | 6/2013 | Kurs et al. |
| 8,461,817 B2 | 6/2013 | Martin et al. |
| 8,466,583 B2 | 6/2013 | Karalis et al. |
| 8,471,410 B2 | 6/2013 | Karalis et al. |
| 8,476,788 B2 | 7/2013 | Karalis et al. |
| 8,482,158 B2 | 7/2013 | Kurs et al. |
| 8,487,480 B1 | 7/2013 | Kesler et al. |
| 8,497,601 B2 | 7/2013 | Hall et al. |
| D692,010 S | 10/2013 | Verghese |
| 8,552,592 B2 | 10/2013 | Schatz et al. |
| 8,558,661 B2 | 10/2013 | Zeine |
| 8,587,153 B2 | 11/2013 | Schatz et al. |
| 8,587,155 B2 | 11/2013 | Giler et al. |
| 8,598,743 B2 | 12/2013 | Hall et al. |
| 8,618,696 B2 | 12/2013 | Kurs et al. |
| 8,621,245 B2 | 12/2013 | Shearer et al. |
| D697,477 S | 1/2014 | Jonas, III |
| 8,629,578 B2 | 1/2014 | Kurs et al. |
| 8,643,326 B2 | 2/2014 | Campanella et al. |
| 8,667,452 B2 | 3/2014 | Verghese et al. |
| 8,669,676 B2 | 3/2014 | Karalis et al. |
| 8,686,598 B2 | 4/2014 | Schatz et al. |
| 8,692,410 B2 | 4/2014 | Schatz et al. |
| 8,692,412 B2 | 4/2014 | Fiorello et al. |
| D705,745 S | 5/2014 | Kurs et al. |
| 8,716,903 B2 | 5/2014 | Kurs et al. |
| 8,723,366 B2 | 5/2014 | Fiorello et al. |
| 8,729,737 B2 | 5/2014 | Schatz et al. |
| 8,760,007 B2 | 6/2014 | Joannopoulos et al. |
| 8,760,008 B2 | 6/2014 | Joannopoulos et al. |
| D709,855 S | 7/2014 | Jonas |
| 8,766,485 B2 | 7/2014 | Joannopoulos et al. |
| 8,772,971 B2 | 7/2014 | Joannopoulos et al. |
| 8,772,972 B2 | 7/2014 | Joannopoulos et al. |
| 8,772,973 B2 | 7/2014 | Kurs |
| 8,791,599 B2 | 7/2014 | Joannopoulos et al. |
| 8,805,530 B2 | 8/2014 | John |
| 8,836,172 B2 | 9/2014 | Hamam et al. |
| 8,847,548 B2 | 9/2014 | Kesler et al. |
| 8,854,176 B2 | 10/2014 | Zeine |
| 8,875,086 B2 | 10/2014 | Verghese et al. |
| 8,901,778 B2 | 12/2014 | Kesler et al. |
| 8,901,779 B2 | 12/2014 | Kesler et al. |
| 8,907,531 B2 | 12/2014 | Hall et al. |
| 8,928,276 B2 | 1/2015 | Kesler et al. |
| 8,937,408 B2 | 1/2015 | Ganem et al. |
| D722,048 S | 2/2015 | Kurs et al. |
| 8,963,488 B2 | 2/2015 | Campanella et al. |
| 9,000,616 B2 | 4/2015 | Greene et al. |
| 9,021,277 B2 | 4/2015 | Shearer et al. |
| 9,142,973 B2 | 9/2015 | Zeine |
| 9,143,000 B2 | 9/2015 | Leabman et al. |
| 9,240,824 B2 | 1/2016 | Hillan et al. |
| 9,608,472 B2 | 3/2017 | Moshfeghi |
| 2004/0150934 A1 | 8/2004 | Baarman |
| 2005/0206577 A1 | 9/2005 | Lee |
| 2008/0054638 A1 | 3/2008 | Greene et al. |
| 2010/0127660 A1 | 5/2010 | Cook et al. |
| 2010/0190436 A1 | 7/2010 | Cook et al. |
| 2010/0244576 A1 | 9/2010 | Hillan et al. |
| 2012/0062358 A1 | 3/2012 | Nowottnick |
| 2013/0026981 A1 | 1/2013 | Van Der Lee |
| 2013/0221915 A1 | 8/2013 | Son et al. |
| 2014/0327323 A1 | 11/2014 | Masaoka et al. |
| 2015/0011160 A1 | 1/2015 | Jurgovan et al. |
| 2016/0020637 A1 | 1/2016 | Khlat |
| 2016/0285489 A1 | 9/2016 | Gong et al. |
| 2016/0301257 A1 | 10/2016 | Parks et al. |
| 2018/0109148 A1* | 4/2018 | Meng .................... H02J 50/12 |

FOREIGN PATENT DOCUMENTS

| | | |
|---|---|---|
| EP | 2755300 A1 | 7/2014 |
| WO | WO 2015064815 A1 | 5/2015 |
| WO | 2016164321 A1 | 10/2016 |

OTHER PUBLICATIONS

International Search Report & Written Opinion for PCT Application PCT/US2017/057015 dated Jan. 18, 2018, 23 pages.
International Search Report & Written Opinion for PCT Application PCT/US2017/026186 dated Jul. 14, 2017, 17 pages.

* cited by examiner

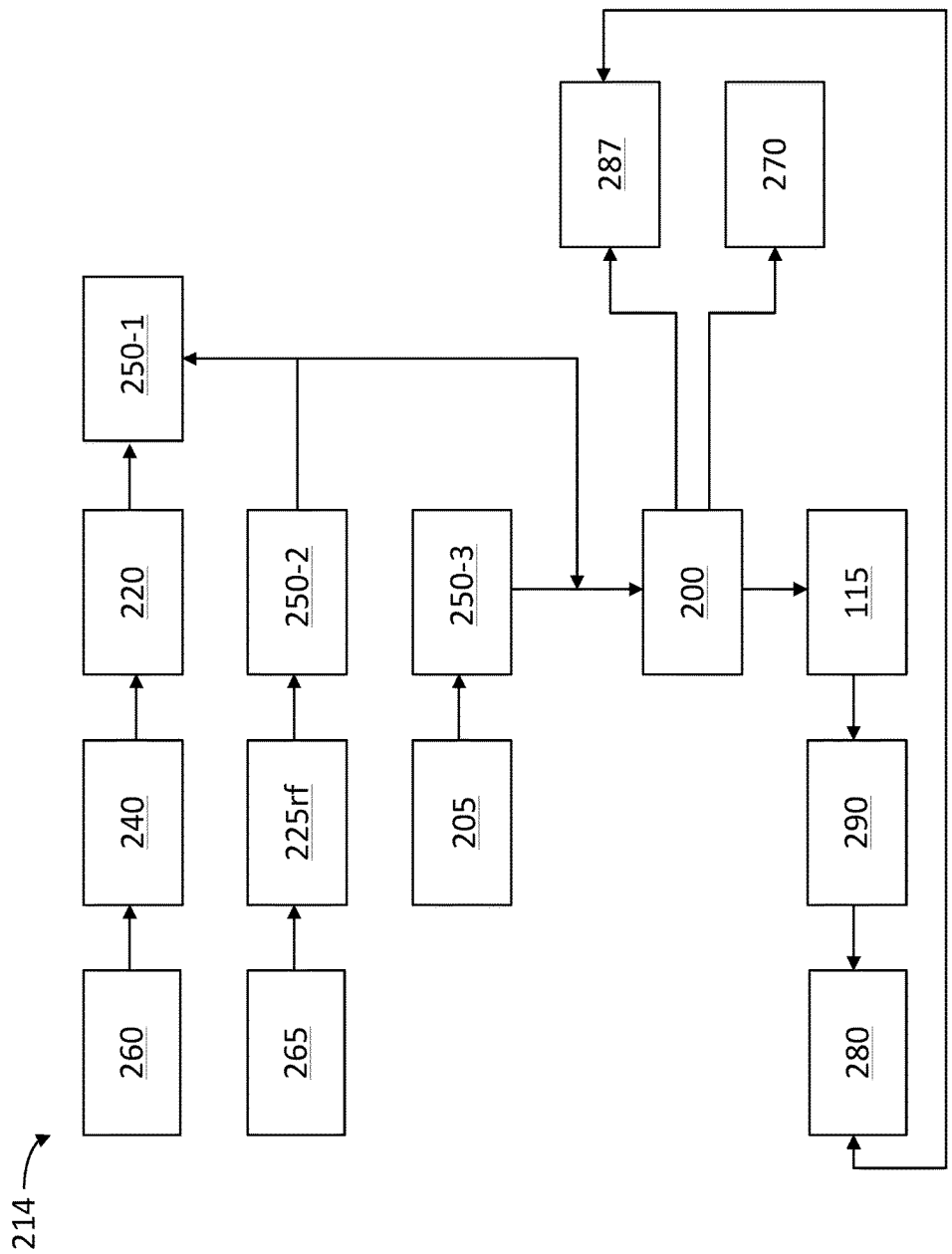

MULTI-MODE ENERGY RECEIVER SYSTEM

CROSS-REFERENCE TO RELATED APPLICATIONS

The present application claims priority to U.S. Provisional Patent Application Ser. No. 62/409,802, entitled "INTELLIGENT MULTI-MODE WIRELESS POWER SYSTEM," to U.S. Provisional Patent Application Ser. No. 62/409,806, entitled "MULTI-MODE ENERGY RECEIVER SYSTEM," and to U.S. Provisional Patent Application Ser. No. 62/409,811, entitled "MULTI-MODE WIRELESSLY RECHARGEABLE BATTERY SYSTEM," all to David F. Meng and William B. Wright, and filed on Oct. 18, 2016, the contents of which are hereby incorporated by reference in their entirety for all purposes.

BACKGROUND OF THE DISCLOSURE

Field of the Disclosure

The present disclosure relates to receiving wireless power in electric or electronic devices and more particularly to improving the wireless reception of power to devices for charging and/or sustaining power to those device loads.

Description of the Related Art

Common electric or electronic devices consume significant levels of electric power with use and a considerable amount of usage occurs while away from main alternate current (AC) power sources traditionally used to supply power to such devices. Due to battery storage limitations, the need for frequent recharging exists in order to sustain device operation. Furthermore, the prevalence of portable electronic devices and devices operating in areas where immediate physical connection with a traditional power source is unavailable, has resulted in increased complexity for management and maintenance of connected electrical power adapters and traditional power sources dependent on power conducting cables.

Current solutions to this problem are based on a singular type of wireless power transfer typically involving restrictions on use and distance that result in either higher power at short distances or lower power at greater distances.

SUMMARY

In certain embodiments, a device is provided that includes a processor configured to identify a power transferring device and to determine a range configuration relative to the power transferring device, and to determine a power status of the device. The device also includes a first antenna configured to receive an oscillating power signal from the power transferring device at a first selected frequency based on the range configuration relative to the power transferring device, and on the power status of the device, and a first rectifier circuit configured to convert the oscillating power signal from the first antenna at the first selected frequency into a direct-current signal to charge a device load.

In certain embodiments, a method is provided that includes identifying, by a power receiving unit, a power transferring unit in a proximity of the power receiving unit, determining a range configuration between the power transferring unit and the power receiving unit, and determining a power status of the power receiving unit. The method also includes selecting a first antenna in the power receiving unit based on the range configuration between the power transferring unit and the power receiving unit, and on the power status of the power receiving circuit, receiving, with the first antenna, an oscillating power signal from the power transferring unit at a selected frequency, converting the oscillating power signal from the power transferring unit at the selected frequency into a direct-current signal, and providing the direct-current signal to a device load.

In certain embodiments, a non-transitory, computer readable medium is provided that stores instructions which, when executed by a processor in a computer, cause the computer to perform a method. The method includes: identifying, by a power receiving unit, a power transferring unit in a proximity of the power receiving unit, determining a range configuration between the power transferring unit and the power receiving unit, and determining a power status of the power receiving unit. The method also includes selecting a first antenna in the power receiving unit based on the range configuration between the power transferring unit and the power receiving unit, and on the power status of the power receiving circuit, receiving, with the first antenna, an oscillating power signal from the power transferring unit at a selected frequency, converting the oscillating power signal from the power transferring unit at the selected frequency into a direct-current signal, and providing the direct-current signal to a device load.

BRIEF DESCRIPTION OF THE DRAWINGS

FIG. 2 is a block diagram of a PRU, according to some embodiments.

DETAILED DESCRIPTION OF THE DISCLOSURE

Figure 1A:
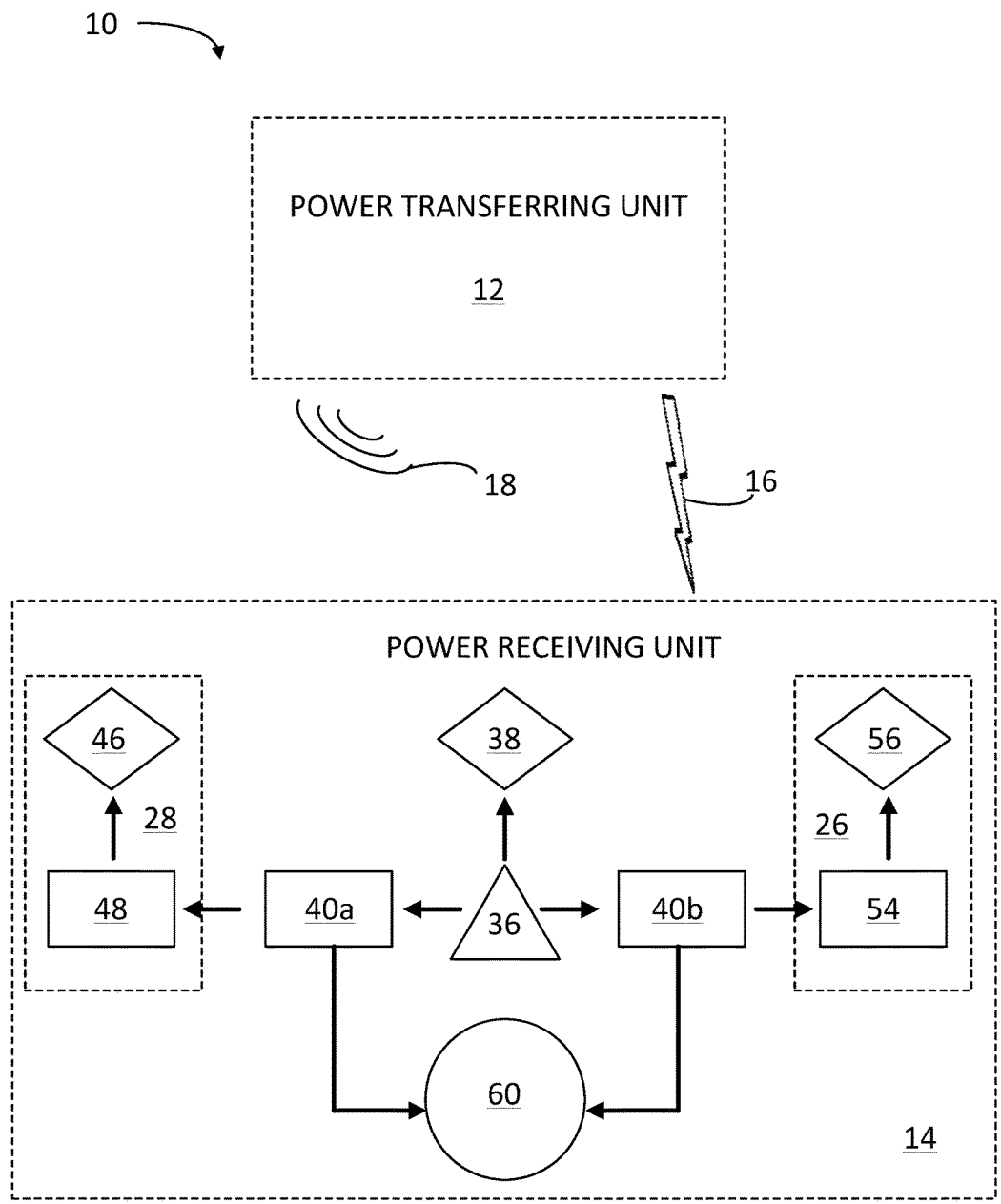
FIG. 1A is a schematic illustration of a system for providing intelligent wireless power to a device load, including a power transferring unit (PTU) and a power receiving unit (PRU), according to some embodiments.

In autonomous, mobile electronic appliances, power management is an issue that has direct impact in the performance and market advantage for the device. Thus, in many applications it is desirable to have extra mobility and autonomy for users as provided by embodiments disclosed herein. For example, in the area of medical devices such as implanted pacemakers and the like, having autonomy from battery recharge is desired as much as technologically feasible. Indeed, battery replacement in such configurations may involve complicated medical or even surgical procedures. To the extent that these procedures can be avoided, or made more infrequent, embodiments as disclosed herein provide an extended power lifetime of the battery of such devices. The present disclosure provides embodiments of intelligent systems that provide a multi-mode wireless power delivery solution without the limitations of conventional systems.

In the field of automotive applications, some embodiments as disclosed herein provide a central power receiving unit that may be installed or coupled with a mobile device (e.g., cell phones, laptops, notepads, and the like) for charging within the enclosure of a car. Accordingly, in embodiments as disclosed herein a driver can focus on the road rather than in looking for a plug to connect a power cord for a device, thereby enhancing road safety.

In one aspect, the present disclosure includes a system and method of receiving wireless power intelligently in a device. Accordingly, embodiments consistent with the present disclosure receive a directed power signal wirelessly from a power transferring unit (PTU) in a power receiving unit (PRU) in a first mode of operation (e.g., when the PRU is in the proximity of a far field range of the PTU). In other aspects, embodiments as disclosed herein include receiving a field (e.g., a resonant magnetic field) wirelessly and inductively coupling the field in the PRU at a resonant frequency of a receiver circuit in a second mode of operation (e.g., when the PRU is in the proximity of a near field range of the PTU). Accordingly, in embodiments consistent with the present disclosure, a power transfer from the PTU to the PRU is managed selectively and efficiently. Embodiments as disclosed herein receive power as desired in the first mode of operation, the second mode of operation, or a combination of both modes simultaneously. Furthermore, embodiments as disclosed herein take into consideration a power requirement of the PRU, and its range relative to the PTU. In some embodiments, multiple PRU's may receive power from a single PTU, wherein the PRUs are sorted according to a prioritization based on the power requirements and range of each PRU relative to the PTU.

In one embodiment, the PRU includes a far field receiver configured to wirelessly receive the directed power signal transmitted from the far field transmitter. The PRU may also include a capture resonator configured to inductively capture resonant magnetic power in the near field generated by the source resonator.

The frequency range of the power received in embodiments consistent with the present disclosure may include, without limitation, a radio-frequency (RF), a low-frequency (LF) inductive magnetic, a high-frequency (HF) resonant magnetic field, or any combination of the above. For example, frequency of any power received may be, but is not limited to, any frequency between about 80 kHz to about 300 kHz (e.g., 110 kHz, 232 kHz, 250 kHz, 278 kHz, 915 MHz, 6.78 MHz, 13.56 MHz, 2.4 GHz or 5.8 GHz).

Some embodiments include a method of managing multimode receipt of wireless power. The method includes optimizing the wireless transfer of power from the PTU in at least the first mode of operation, the second mode of operation, or the two modes of operation simultaneously. The method includes capturing and receiving the optimized power transferred wirelessly over varying distances by one or more power receiving units (PRU's). Some embodiments include a micro-controller circuit (MCC) configured to dynamically update a status of a range configuration between the PRU and the PTU to maximize the amount of power transferred between the devices in a dual mode, when available. Furthermore, some embodiments include a power harvesting configuration that exploits the large amount of unused digital data propagating at RF frequencies wirelessly to convert the digital signals into power transferred to the PRU. In such configuration, the MCC includes the reception and availability of the digital signals for harvesting. Moreover, in some embodiments the MCC is further configured to prioritize the desire for power for one or more PRU's in close proximity of the PTU. Thus, the load on the PTU is optimized for the needs of the one or multiple PRU's benefiting from the power transfer.

The present disclosure addresses the shortcomings of existing single-mode wireless power receiving systems such as low power transfer from a far field source or the limited spatial freedom of near field power transfer inherent to these technologies. At the same time, embodiments consistent with the present disclosure obviate a need for traditional wired or cabled power delivery methods. Advantages of the present disclosure include increased efficiency, added redundancy for applications where critical loss of available power could be detrimental to the user and optional spatial versatility when lower power transfer rates are acceptable while providing power to or charging an electric or electronic device.

FIG. 1A illustrates a system 10 for receiving intelligent wireless power in a device in accordance with the principles of the present disclosure. System 10 includes PTU 12 and PRU 14. PTU 12 is configured to transmit a directed power signal 16 wirelessly in a first mode of operation to PRU 14. In some embodiments, PTU 12 is further configured to generate an inductively coupled (e.g., a resonant magnetic field) power signal 18 wirelessly in a second mode of operation. PRU 14 is configured to receive the directed power signal 16 from PTU 12 when PRU 14 is in the far field range of PTU 12. Further, PRU 14 is also configured to receive inductively coupled power signal 18 in the second mode when PRU 14 is in the proximity of a near field range of PTU 12.

In some embodiments, PRU 14 includes a micro-computer circuit (MCC) 36, which is a processor configured to identify PTU 12, to determine a range configuration between PRU 14 and PTU 12, and to determine a power status of PRU 14.

PRU 14 may also include antenna 46, and antenna 56. Antennas 46 and 56 may be configured to receive oscillating power signals (e.g., directed propagating power signal 16 and inductively coupled power signal 18) from PTU 12. Each of directed power signal 16 and inductively coupled signal 18 may oscillate at a selected frequency. For example, in some embodiments directed power signal 16 is a RF signal at about 915 MHz, and inductively coupled signal 18 is a RF magnetic field oscillating at 6.7 MHz, or at any frequency in a range between about 80 kHz to 300 kHz. The frequency of oscillation of directed power signals 16 and inductively coupled power signal 18 may be indicative of the range configuration of PRU 14 relative to PTU 12. For example, in a far field range configuration a directed propagating RF signal oscillating at approximately 915 MHz (signal 16) may be desirable. And in a near field range configuration an inductively coupled power signal oscillating at approximately 6.7 MHz or even lower (e.g., 80-300 kHz) may be desirable. In some embodiments, the choice between receiving power from directed power signal 16, from inductively coupled power signal 18, or from any combination of both, is selected by MCC 36 based on a power status of PRU 14. For example, when PRU 14 is substantially depleted of power, it may be desirable to recharge using both directed power signal 16 and inductively coupled power signal 18, from PTU 12, simultaneously (as long as the range configuration between PTU 12 and PRU 14 is within the near field). In some embodiments, PRU 14 also includes a first and a second rectifier circuits 40a and 40b, configured to convert the oscillating power signal (18 and 16, respectively) from antennas 46 and 56 at the selected frequency, into a direct-current signal to charge a device load 60.

PRU 14 includes a far field receiver 26 configured to wirelessly receive the directed power signal 16 transmitted from PTU 12 when PRU 14 is within a far field range of PTU 12. PRU 14 also includes a capture resonator 28 configured to capture inductively coupled power signal 18 generated by PTU 12 when PRU 14 is within a near field range of PTU 12.

In one embodiment, PRU 14 includes an MCC 36 configured to intelligently manage the power transfer in the near field mode, the far field mode, or both modes, as desired. A communications circuit 38 is configured to communicate information between PTU 12 and PRU 14. A rectifier circuit 40a is configured to convert power from a capture resonator 28 and provide the power to a device load 60. Likewise, a rectifier circuit 40b is configured to convert power from a far field receiver 26 and provide the converted power to device load 60. Rectifier circuits 40a and 40b will be collectively referred to, hereinafter, as rectifier circuits 40.

In some embodiments, rectifier circuits 40 include an amplifier circuit to amplify the oscillating power signal from antennas 46 and 56, and to provide an amplified oscillating signal to a rectifying portion of rectifier circuits 40.

In some embodiments, antenna 46 in capture resonator 28 includes a capture coil operatively connected to an impedance matching circuit (IMC) 48. In some embodiments, far field receiver 26 includes a signal conversion module 54 and a far field receiver antenna(s) 56.

In some embodiments, directed power signal 16 and inductively coupled field 18 include an oscillating power signal having a bandwidth. For example, directed power signal 16 oscillating at 915 MHz may have a bandwidth of approximately 50 MHz, or more. Likewise, inductively coupled field 18 oscillating at 6.7 MHz may have a bandwidth of approximately 20 MHz, or more. Further, in some embodiments device load 60 may include multiple devices attached to a docking station in PRU 14. Accordingly, rectifier circuits 40 may be configured to convert portions of the oscillating power signal within separate portions of the bandwidth to charge each of the multiple devices.

In some embodiments, transmitters and resonators as disclosed herein convert RF signals from instruments and devices to directed power signal 16 and inductively coupled signal 18 oscillating at an industrial, scientific and medical (ISM) frequency band appropriately optimized for the application of the system and within accordance of regulatory rules and laws governing such wireless operations.

Figure 1B:
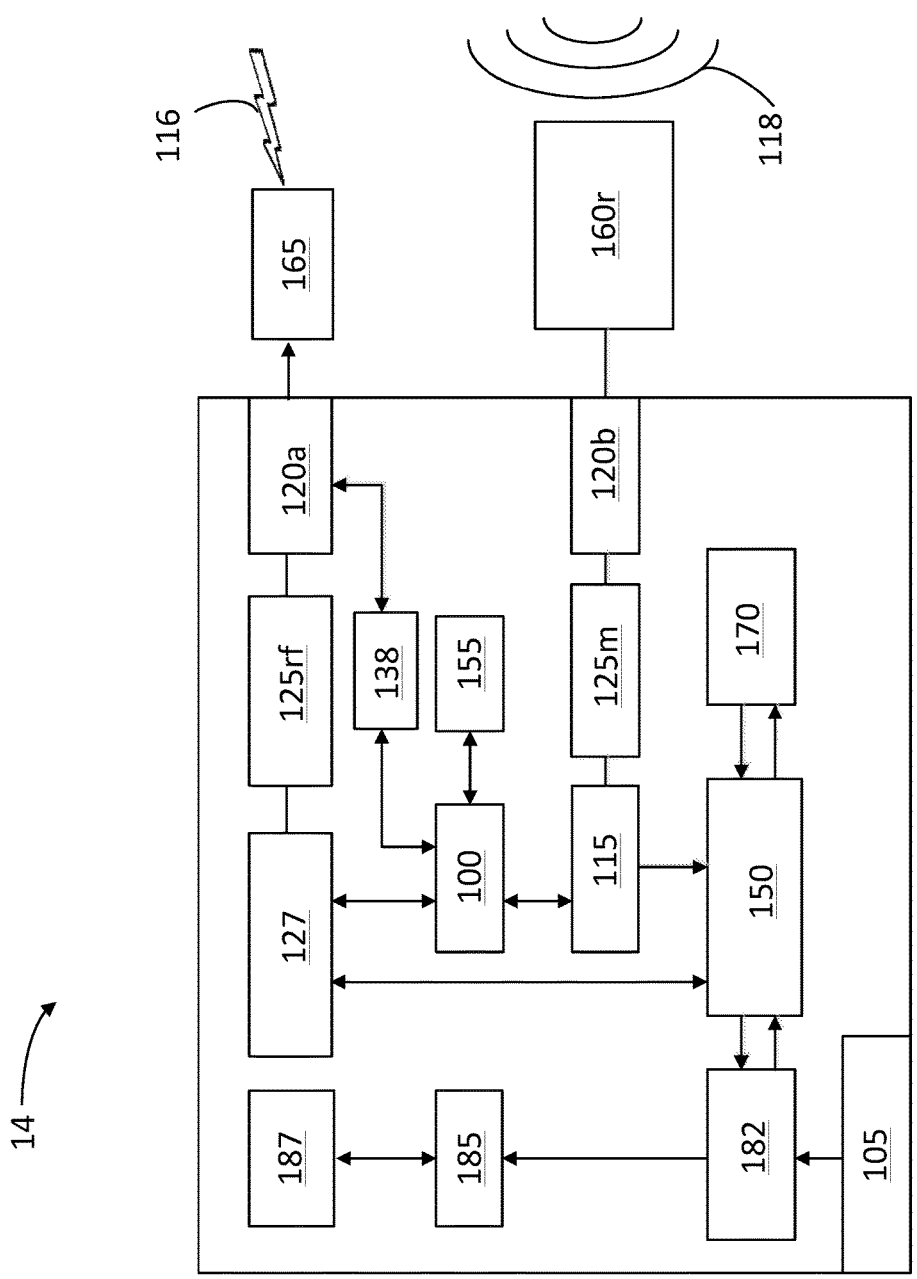
FIG. 1B is a schematic illustration of a PRU, according to some embodiments.

FIG. 1B is a schematic illustration of PRU 14, according to some embodiments. PRU 14 may include a communications circuit 138 configured to communicate information between PTU 12 and PRU 14 (e.g., communications circuit 38).

Antenna 165 is configured to wirelessly receive a directed power signal 116 transmitted from PTU 12. In some embodiments, antenna 165 is a far field receiver configured to wirelessly receive the directed power signal transmitted from the far field transmitter. In some embodiments, a passively-tuned integrated circuit (PTIC) 120a may be configured to amplify directed power signal 116 from antenna 165. In some embodiments, PTIC 120a is configured to dynamically tune a transmission circuit for various requirements (e.g., frequencies of operation). A RF to DC circuit 125rf converts directed power signal 116 from a RF oscillating signal provided by PTIC 120a into a DC signal having a received voltage and a selected current. In some embodiments, RF to DC circuit 125rf may include a rectifier circuit as disclosed herein (e.g., rectifier circuits 40). Voltage control 127 adjusts the received voltage to a pre-selected value and provides a directed power signal to a charge management IC 150.

PRU 14 includes an Rx resonator 160r configured to receive an inductively coupled field from PTU 12. In some embodiments, the inductively coupled field is a magnetic field modulated at a low RF (e.g., 6.78 MHz, 13.56 MHz, and the like) compared to the operation frequency of antenna 165 (e.g., 915 MHz). The RF of the magnetic field tuned to a resonant frequency of Rx resonator 160r. Further, in some embodiments, the resonant frequency of Rx resonator 160r is tuned to the frequency of inductively coupled power signal 118 by PTIC 120b. In some embodiments, PTIC 120b is configured to dynamically tune a receiver circuit for various requirements (e.g., frequencies of operation). Accordingly, in some embodiments, PTIC 120b may include a source coil operatively connected to an IMC (e.g., IMC 48). Rx resonator 160r initiates a power transfer from PTU 12 when PRU 14 is located within a near field range of PTU 12. Rectifier 125m is configured to convert the inductively coupled field (e.g., a low RF modulated magnetic field) into a DC power signal including a voltage and a current. DC to DC converter 115 amplifies the DC power signal from rectifier 125m and provides an inductive power signal at a specified voltage (e.g., 3.3V) to charge management IC 150.

In some embodiments, charge management IC 150 includes a USB controller configured to handle a USB-type coupling with external devices (e.g., a device 187, USB to USB port 182, and USB socket 105). Charge management IC 150 provides a power signal to battery 170, at a selected DC voltage and a selected DC current. Accordingly, charge management IC 150 combines the directed power signal from voltage control 127 and the inductive power signal to provide a power signal that charges battery 170. Furthermore, in some embodiments, charge management IC 150 may select only one or the other of the directed power signal or the inductive power signal, depending on their availability and the mode of operation of PRU14, to provide the power signal to battery 170.

In some embodiments, PRU 14 is coupled with device 187 through a device socket 185. Device 187 may be any type of mobile electronic appliance such as a computer, a laptop computer, a mobile phone, smart phone, tablet computer, and tablet phone. Furthermore, in some embodiments, device 187 and running a software program for the purpose of displaying session data and offering additional command options for the power transfer session in a visual format. Moreover, in some embodiments battery 170 is a battery for device 187, integrally installed in device 187, or independently coupled to charge management IC 150. Moreover, in some embodiments device socket 185 may support multiple devices 187 configured to be charged by PRU 14.

In some embodiments, battery 170 is a reserve battery and may be charged via USB socket 105 and USB port 182 by a direct DC power source such as a laptop/computer, wall adaptor or power bank. Thus, device 187 may be charged at a later time from the charge in battery 170 (e.g., when PRU 14 is unplugged from a DC power source in USB socket 105). Accordingly, in some embodiments USB socket 105 and USB port 182 may be used for charging device 187 from the direct DC power source. In some embodiments, device 187 may be a phone externally coupled to USB socket 105 for charging, as a power bank. Thus, in some embodiments PRU 14 may charge an external device via USB socket 105, and in some embodiments USB port 182 may receive a direct source of power coupled through USB socket 105 to charge battery 170. Accordingly, embodiments consistent with the present disclosure provide device 187 with multiple options for charging.

PRU 14 includes a MCC 100 and a memory 155. MCC 100 may be as described in detail above with regard to MCC 36. In some embodiments, MCC 100 is configured to control the receiving of the directed power signal at antenna 165 from PTU 12 when PRU 14 is in the proximity of a far field range of PTU 12. Further, in some embodiments MCC 100 is configured to control the coupling of an inductive field wirelessly provided by PTU 12, to the resonate magnetic field in the second mode when PRU 14 is in the proximity of a near field coupling range of PTU 12. Accordingly, MCC 100 may be further configured to control charge management IC 150 wherein power is transferred to PRU 14 from PTU 12 by managing the directed power signal and the resonant magnetic field to deliver power as needed by the first mode of operation, the second mode of operation, or both modes of operation and with consideration to the power requirement of PRU 14, a priority value for transferring power to PRU 14, and a range configuration between PTU 12 and PRU 14. Accordingly, MCC 100 may be configured to manage and determine the power requirement of PRU 14 and the priority value for transferring power to PRU 14 in view of the range configuration between PTU 12 and PRU 14. Furthermore, in some embodiments the power requirement of PRU 14 may include a power requirement of device 187 docked in device socket 185. Memory 155 may include instructions to cause MCC 100, upon successfully establishing a communication link with PTU 12 via a communication protocol, and upon determining the presence of a corresponding software program installed on a device capable of running the software will provide relevant wireless power transfer session data in a visual format via said software program. In some embodiments, the second MCC is integrated into one or more of the IC components in device 187.

FIG. 2 is a schematic illustration of a PRU 214, according to some embodiments. PRU 214 includes a battery 270, according to some embodiments. In some embodiments, battery 270 includes a charge reserve battery with capacity to deliver current from about 1800 milliamps per hour (maH) to about 2800 maH. A antenna 280 is activated by controller 290 to provide a signal to a PTU (e.g., PTU 12). In some embodiments, antenna 280 is a BlueTooth antenna. For example, the signal provided by antenna 280 to the PTU may indicate a power requirement for battery 270, or a range configuration between the PTU and PRU 214. DC to DC converter 115 amplifies a control signal for antenna 280 to controller 290. The control signal for antenna 280 may be provided by a power management IC (PMIC) 200. PMIC 200 provides a 5-9V power signal to device 287, and a 3.5-4.2V power signal to reserve battery 270. In some embodiments, PMIC 200 may include a switch configured to shift power transfer between device 287 and reserve battery 270 (e.g., when device 287 is de-docked into PRU 214, or when device 287 is fully charged), or from battery 270 to a mobile device (e.g., device 287, when docked into PRU 214, or when battery 270 is fully charged). Device 287 may also couple with antenna 280 through a bluetooth connection. Accordingly, device 287 may be an external device docked onto PRU 214 by a user, for re-charging (e.g., device 187).

To receive the transferred power from the PTU, PRU 214 includes a resonator 260 that couples with matching circuit 240. Matching circuit 240 may tune resonator 260 to a particular RF frequency of an inductively coupled near field power signal provided by the PTU (e.g., a RF resonant magnetic field). The inductively coupled near field power signal is provided to ASIC 220 and to a diode 250-1 (e.g., at 5V and 2 A). Antenna 265 is configured to receive a RF directed power transferred by the PTU, and is coupled with RF to DC circuit 225rf which provides a DC power signal (e.g., at 5V and 200 mA) to an ideal diode 250-2. Accordingly, RF to DC circuit 225rf may be a rectifier circuit as disclosed herein (e.g., rectifier circuits 40 and 125rf). In some embodiments, a device cable 205 provides direct power to ideal diode 250-3 (e.g., at 5V and 2.5 A). Ideal diodes 250-1 250-2 and 250-3 will be collectively referred to, hereinafter, as "diodes 250." The configuration of diodes 250 in PRU 214 enables PMIC 200 to receive power signals from three different sources: inductively coupled near field power signal, RF directed power signal (both from the PTU), and from an external source through device cable 205.

In some embodiments, any one of antennas 280, 265, and resonator 260 may be configured to detect multiple wireless signals operating at multiple frequencies. Accordingly, PMIC may be further configured to tune antenna 280, 265 or resonator 260 at a frequency of one of the multiple wireless signals and to cause RF to DC circuit 225rf to convert at least one of the wireless signals into the direct-current signal.

In some embodiments, PMIC 200 may include a power protection circuit to determine a fault condition in the direct-current signal, such as an over voltage condition, an over charge condition, and an over temperature condition.

Figure 3A:
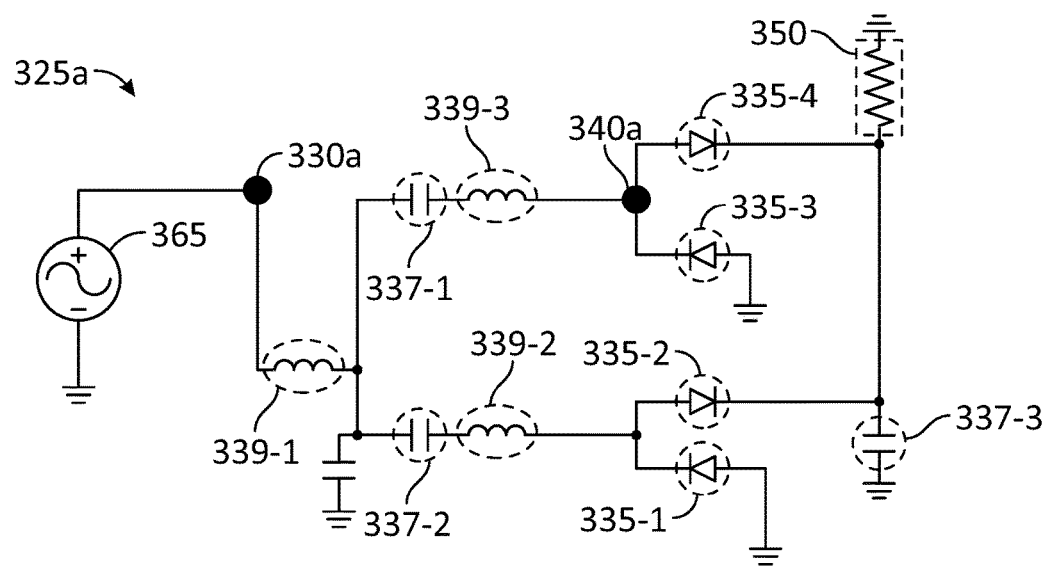
FIGS. 3A-B illustrate rectifier circuits used in RF to DC current conversion in a PRU, according to some embodiments.
Figure 3B:
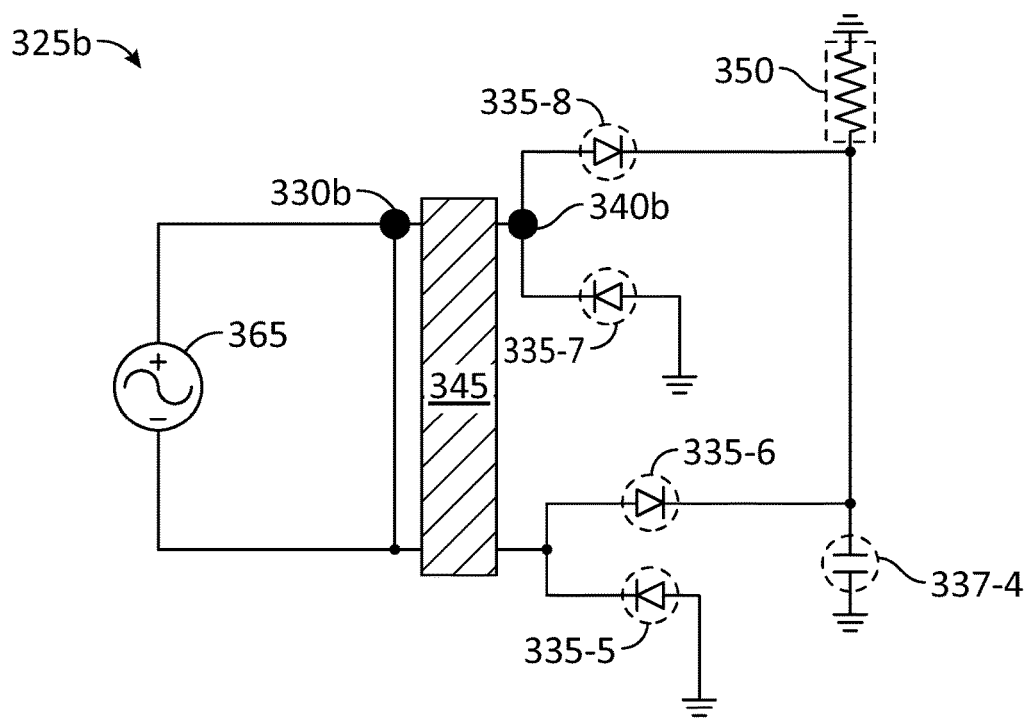

FIGS. 3A-B illustrate rectifier circuits 325a and 325b, respectively (hereinafter, collectively referred to as "rectifier circuits 325") used in RF to DC current conversion in a PRU, according to some embodiments. The DC current is provided to a device load 350 (e.g., device load 60).

Rectifier circuit 325a may be included in PRU 14 (e.g., RF to DC circuit 125rf). An input port 330a is coupled to an antenna 365 through a PTIC circuit (e.g., antenna 165, PTIC circuit 120). Diodes 335-1, 335-2, 335-3, and 335-4 (hereinafter collectively referred to as "diodes 335") are arranged in a configuration such that an "up-swing" is captured by a capacitor 337-1, and a "down-swing" is captured by a capacitor 337-2 (hereinafter collectively referred to as "capacitors 337"). The charge of capacitors 337 is integrated in output port 340a as a DC signal. In some embodiments, a capacitor 337-3 is adjusted according to a DC to DC conversion circuit (e.g., DC to DC converter 115). Capacitor 337-3 will be referred to, hereinafter, together with capacitors 337.

In RF to DC conversion circuit 325a, inductors 339-1, 339-2, and 339-3 (hereinafter, collectively referred to as inductors 339) are configured to be resonantly tuned to a RF frequency of a directed energy signal (e.g., 915 MHz, and the like).

Rectifier circuit 325b includes diodes 335-5, 335-6, 335-7, and 335-8 (collectively referred to, hereinafter, as "diodes 335," similarly to rectifier circuit 325a). Different diodes may be evaluated for cost, packaging, and performance. In some embodiments, rectifier circuit 325b includes a differential coupling of antenna 365 to balancing block 345. Input port 330b and output port 340b are as input/output ports 330a/340a described above, respectively.

In some embodiments, at least some of diodes 335 may generate undesirable harmonics of the RF signal (Radiated Spurious Emissions, RSE). These harmonics may be radiative and cause issues with FCC limits (e.g., interference with other devices or conducting materials in the vicinity, health impact on surrounding people, and the like). Accordingly, in some embodiments, rectifier circuit 325*b* includes a radio-frequency shield to prevent a harmonic re-radiation of the oscillating power signal from any one of diodes 335. Some embodiments may include additional components to block higher order harmonics from re-radiating through antenna 365. In some embodiments, a capacitor 337-4 is adjusted according to a DC to DC conversion circuit (e.g., DC to DC converter 115). Capacitor 337-4 will be referred to, hereinafter, together with capacitors 337 in rectifier circuit 325*a*.

Balancing block 345 includes a three port device with matched input and differential outputs to enhance power transfer efficiency. In some embodiments, balancing block 345 includes a Balun circuit, or an impedance matching circuit. Further, in some embodiments balancing block 345 is used to compensate for an unbalanced coupling of antenna 365. Accordingly, in some embodiments balancing block 345 includes a balancing circuit that receives a differential input from the oscillating power signal in antenna 365. In other aspects, balancing block 345 may include a matching circuit configured to balance a differential coupling of the first antenna to provide the direct-current signal to the device load.

Figure 4A:
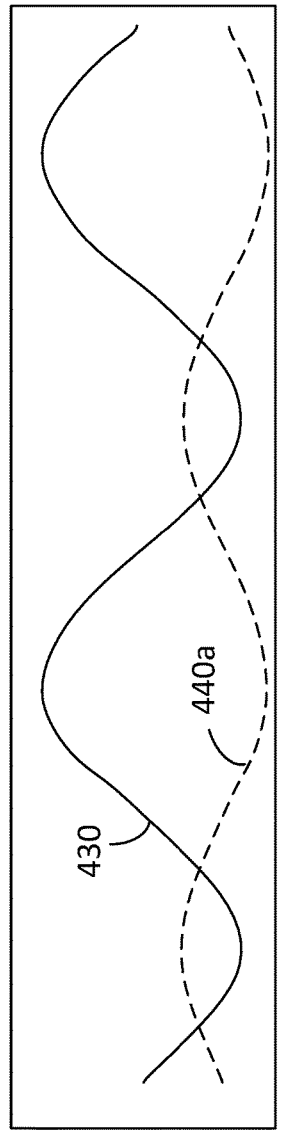
FIGS. 4A-C illustrate rectified waveforms as provided by a rectifier circuit in a PRU, according to some embodiments.
Figure 4B:
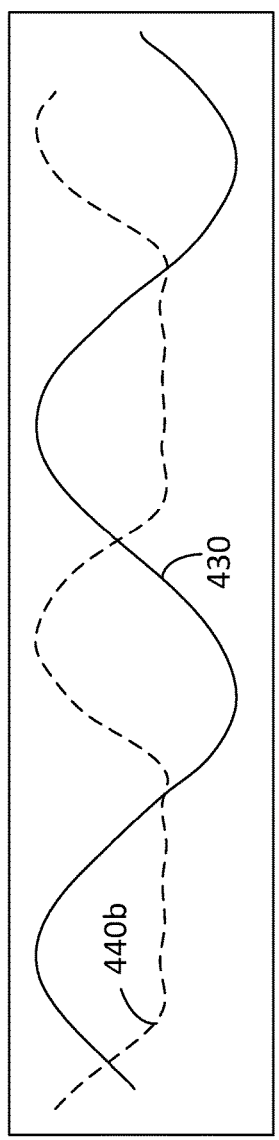
Figure 4C:
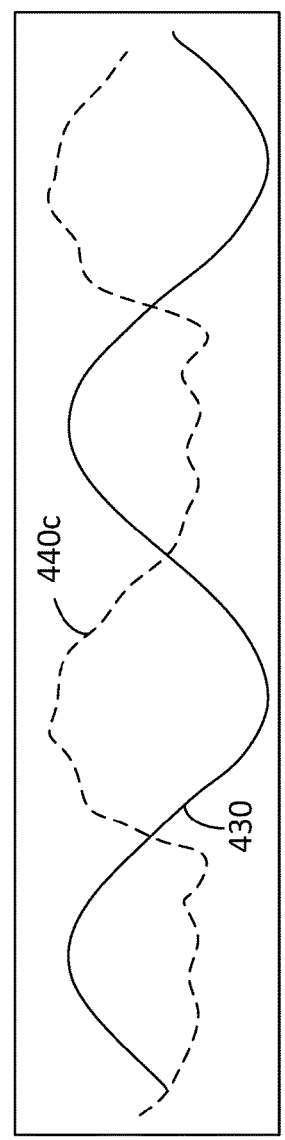

FIGS. 4A-C illustrate rectified waveforms 440*a*-*c*, respectively (collectively referred to, hereinafter, as "rectified waveforms 440"), as provided by rectifier circuit 325*a*, according to some embodiments. Rectified waveforms 440 illustrate input oscillating power signal 430 (e.g., as measured at point 330 in rectifier circuit 325), and rectified waveforms 440 are the resulting signal corresponding to a given load (e.g., measured at point 340, for different load 350).

FIG. 4A illustrates rectified waveform 440*a* for an open load.

FIG. 4B illustrates rectified waveform 440*b* for a 50 ohm load. Waveform 440*b* indicates a half-wave rectification by rectifier circuit 325*a*.

FIG. 4C illustrates rectified waveform 440*c* for a 1000 Ohm load. Waveform 440*c* indicates a somewhat distorted, half-wave rectification by rectifier circuit 325*a*.

Figure 5A:
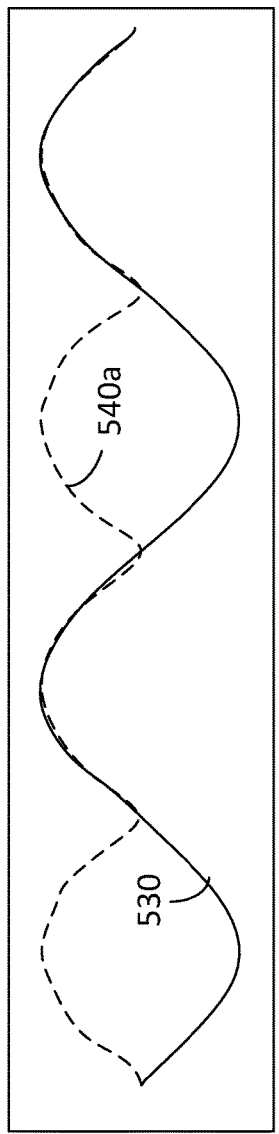
FIGS. 5A-C illustrate rectified waveforms as provided by a rectifier circuit in a PRU, according to some embodiments.
Figure 5B:
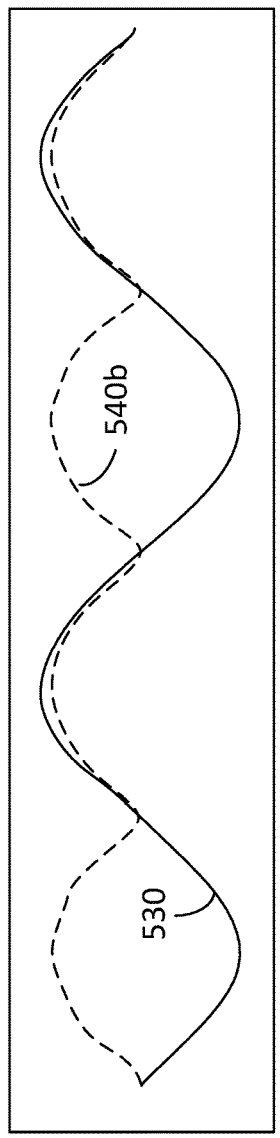
Figure 5C:
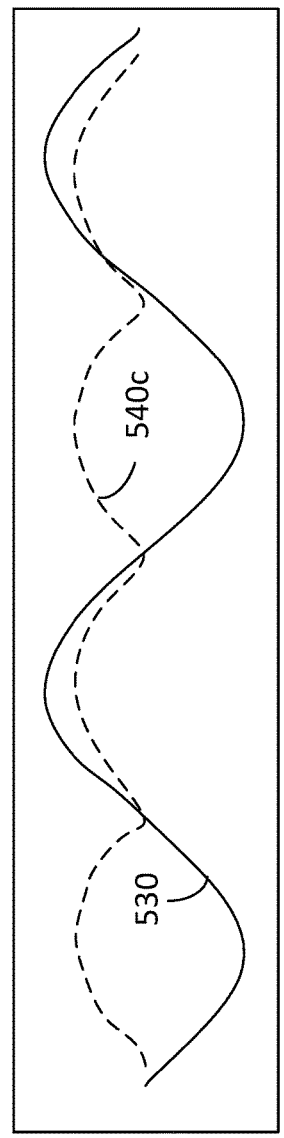

FIGS. 5A-C illustrate rectified waveforms 540*a*-*c*, respectively (collectively referred to, hereinafter, as "rectified waveforms 540"), as provided by rectifier circuit 325*b* including balancing block 340, according to some embodiments. Rectified waveforms 540 illustrate input oscillating power signal 530 (e.g., as measured at point 330 in rectifier circuit 325), and rectified waveforms 540 are the resulting signal corresponding to a given load (e.g., measured at point 340, for different load 350).

FIG. 5A illustrates rectified waveform 540*a* for an open load. Waveform 540*a* indicates a high fidelity, full wave rectification by rectifier circuit 325*b*.

FIG. 5B illustrates rectified waveform 540*b* for a 50 ohm load. Waveform 540*b* indicates a slightly distorted full wave rectification by rectifier circuit 325*b*.

FIG. 5C illustrates rectified waveform 540*c* for a 1000 Ohm load. Waveform 540*c* indicates a full wave rectification by rectifier circuit 325*b* with a somewhat higher distortion than waveform 540*b*.

Figure 6A:
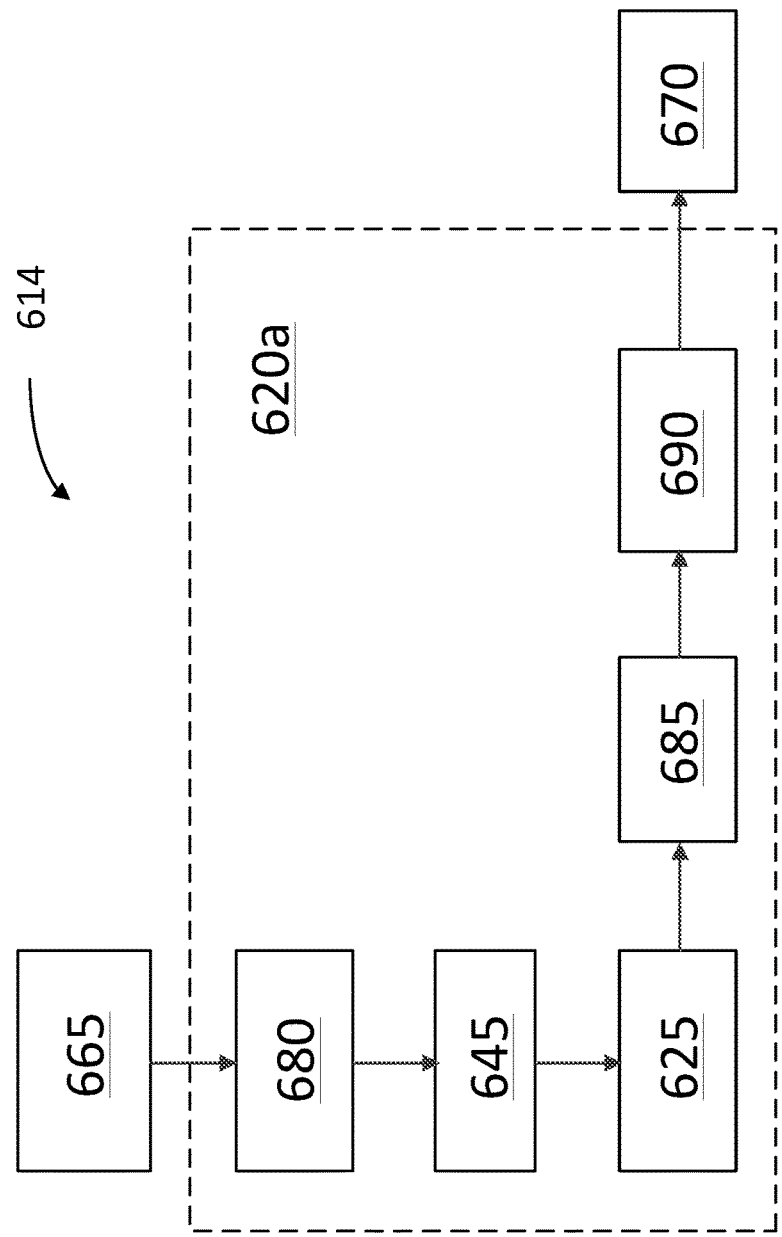
FIGS. 6A-B illustrate block diagrams of a RF to a DC conversion circuit, according to some embodiments.
Figure 6B:
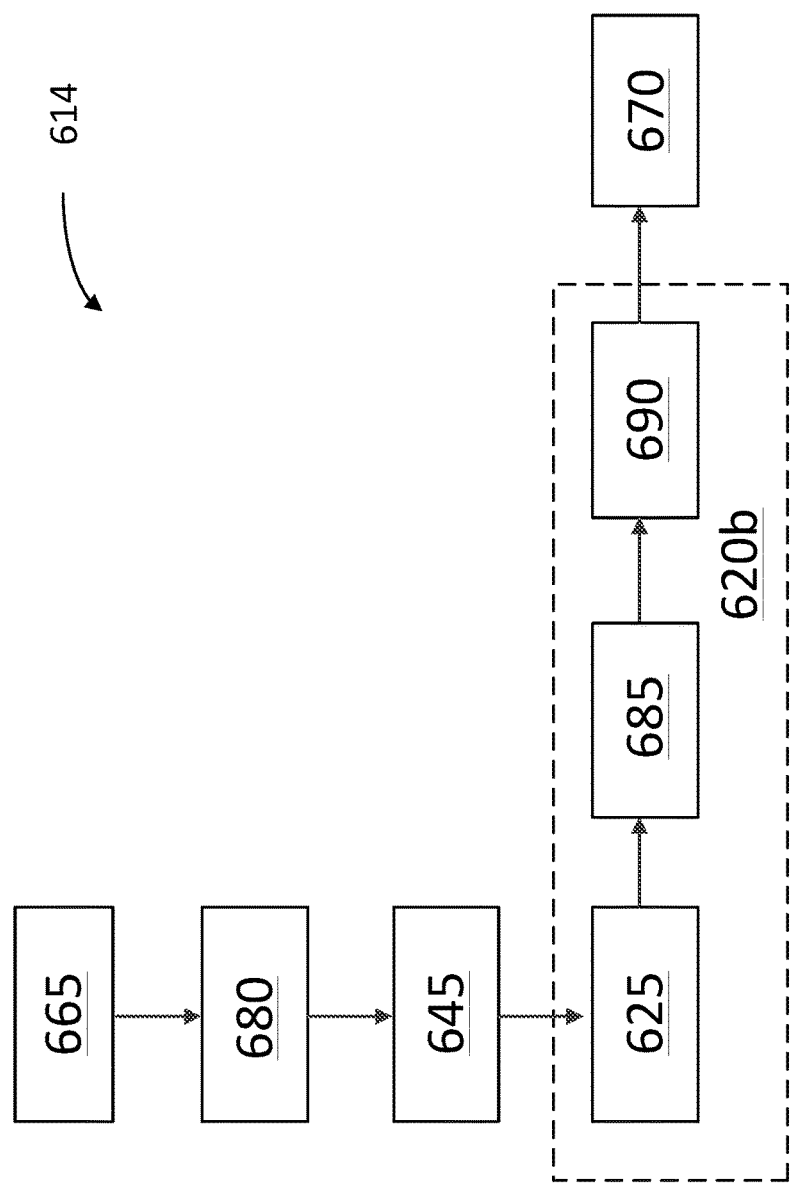

FIGS. 6A-B illustrate block diagrams of a PRU 614 including a RF to DC block 620*a*, and a RF to DC block 620*b* (hereinafter, collectively referred to as "RF to DC blocks 620"), according to some embodiments. In some embodiments, PRU 614 includes an antenna 665 may be as disclosed herein (e.g., antennas 165, 265, 365). A connector 680 for antenna 665 may include a miniature RF connector (e.g., "uf1" connector) for high-frequency signals up to 6 giga-Hertz (1 GHz=$10^9$ Hz), or more. In some embodiments PRU 614 includes a matching circuit 645 including a balancing block as disclosed herein (e.g. balancing block 345). In some embodiments, matching circuit 645 may be included in a rectifier circuit 625 consistent with embodiments disclosed herein (e.g., rectifier circuits 325).

In some embodiments, PRU 614 also includes an energy harvesting circuit 685 (e.g., of size about 3 mm×3 mm), to pick up, collect, and convert to a DC power, a radiating power signal available in the environment of PRU 614. The radiating power signal may be a telecommunication signal from external devices, and it may include information stored in it (e.g., codified or encrypted information). A regulator 690 to determine voltage and current levels of a DC power delivered to battery 670 or to a device load (e.g., device load 60), according to battery and device specifications.

In some embodiments, block 620*a* includes connector 680, matching circuit 645, rectifier circuit 625, harvesting circuit 685, and regulator 690 in a compact unit (e.g., of size 7.2 mm×11.4 mm). Including connector 680 and matching circuit 645 increases the constraints for real-estate in the area allocated for block 620*a*, including the architecture types available for antenna 665. In some embodiments, block 620*b* includes rectifier 625, energy harvesting circuit 685, and regulator circuit 690 in a compact unit (e.g., of size 7.2 mm×11.4 mm). Excluding connector 680 and matching circuit 645 relaxes the real-estate constraint in block 620*b* and allows the use of balanced, unbalanced, printed, and peripheral elements in antenna 665, thereby widening the range of possibilities for antenna design.

Figure 7:
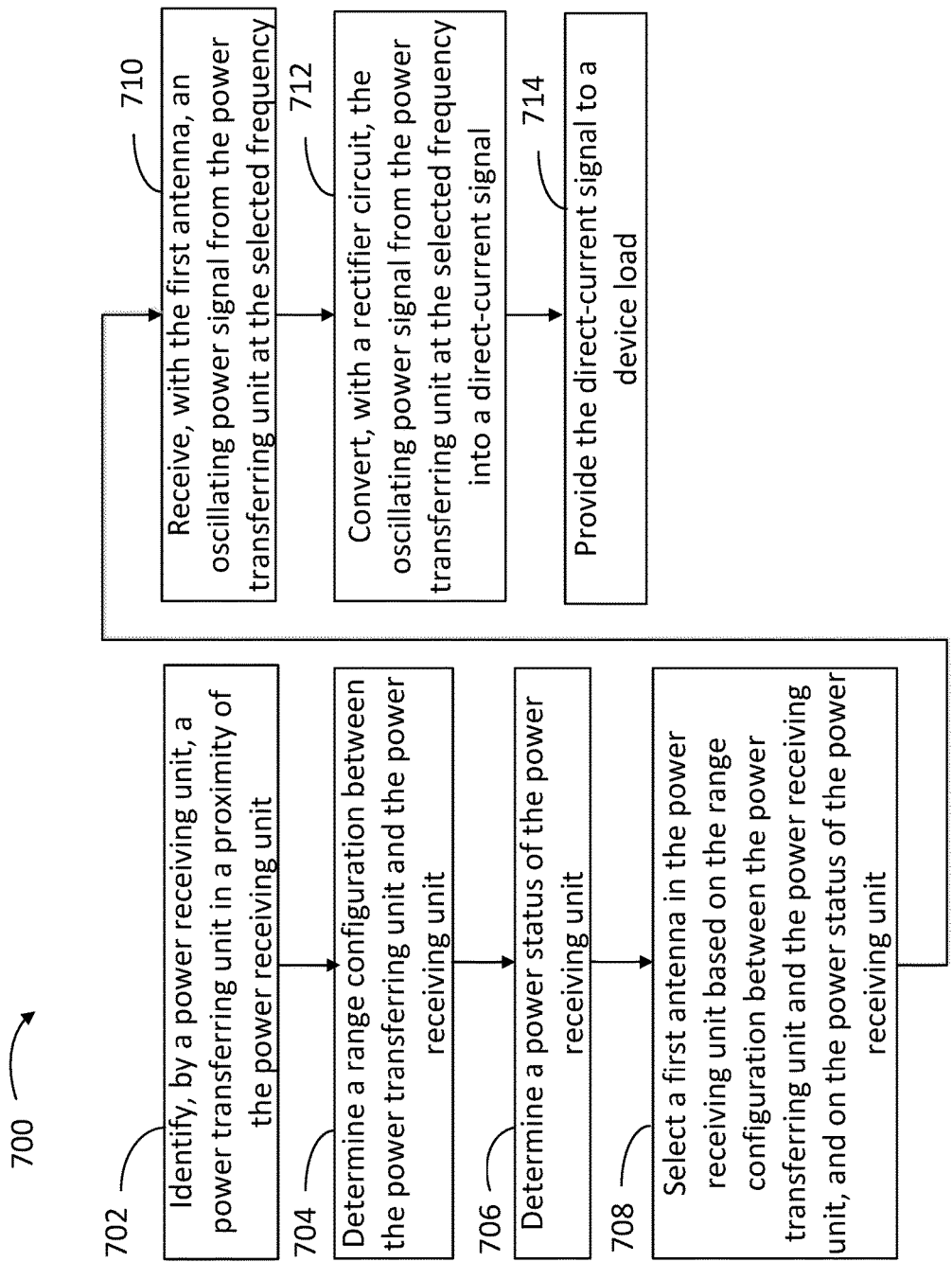
FIG. 7 is a flowchart illustrating steps in a method for managing, from a power receiving unit, a power transfer from a PTU, according to some embodiments.

FIG. 7 is a flowchart illustrating steps in a method 700 for managing, from a power receiving unit, a power transfer from a power transferring unit, according to some embodiments. The PRU provides the transferred power to charge or re-charge a battery (e.g., battery 170). Method 700 may be performed at least partially by any one of MCC circuits installed in the PRU device, executing instructions stored in a memory (e.g., MCC 36, and MCC 100 and memory 155), while communicating with each other through a communications circuit (e.g., communications circuit 38, and 138). In some embodiments, method 700 is partially performed by a PTU in communication with one or more PRU's roaming in the proximity of the PTU. Each of the one or more PRU's may be handled by a user having access authorization to a power charging service of the PTU. Methods consistent with the present disclosure may include at least some, but not all of the steps illustrated in method 700, performed in a different sequence. Furthermore, methods consistent with the present disclosure may include at least two or more steps as in method 700 performed overlapping in time, or almost simultaneously.

Step 702 includes identifying, by the PRU, a PTU in proximity of the PRU.

Step 704 includes determining a range configuration between the PTU and the PRU. In some embodiments, step 704 includes determining whether the PRU is in a near field range or in a far range of the PTU. In some embodiments, step 704 includes determining a geolocation of the PRU from the communication circuit in the PRU. Further, in some embodiments step 704 may include determining that the PRU is in the near field range when the PRU is within a few millimeters (mm), e.g., 2 mm, 3 mm, or less than 5 or 10 mm. In some embodiments, step 704 may include determining that the PRU is in the far field range of the PTU when the PRU is within a few meters (m) of the PTU (e.g., 1 m, 2 m, or 5 to 10 m). In some embodiments, the near field range can extend further distances, such as 6-8 inches (e.g., about 15-40 cm), depending on power transfer efficiency and safety considerations. In some embodiments, a far field range may include distances of about 1-2 meters, or 3-12 meters. In some embodiments, efficient RF power transfer can be achieved from 1-12 meters in a far field range.

Step 706 includes determining the power status the power receiving unit. In some embodiments, step 706 may include receiving a charge percentage of a battery in the PRU (e.g., 10%, 50%, or 100% and the like). In some embodiments, step 706 may also include receiving a "time remaining" for the operation of the PRU based on the power status, current usage conditions, and other environmental factors (e.g., temperature and the like). For example, in some embodiments step 706 may include receiving from the PRU a message as "10 minutes (min) remaining," "5 min. remaining," and the like.

Step 708 includes selecting a first antenna in the PRU based on the range configuration between the PTU and the PRU, and on the power status of the PRU. In some embodiments, step 708 includes selecting a radio-frequency antenna to receive a directed radio-frequency power when the range configuration between the power transferring unit and the power receiving unit is within a far field, and selecting an inductively coupled antenna when the range configuration between the power transferring unit and the power receiving unit is within a near field. In some embodiments, step 708 may also include selecting a radio-frequency antenna configured to receive a propagating, directed radio-frequency signal as the oscillating power signal when the range configuration between the power transferring unit and the power receiving unit is beyond a near field configuration and within a far field configuration. In some embodiments, step 708 includes simultaneously selecting a radio-frequency antenna configured to receive a propagating, directed radio-frequency signal and an inductively coupled antenna, when the range configuration between the power transferring unit and the power receiving unit is within a near field configuration.

Step 710 includes receiving, with the first antenna, an oscillating power signal from the power transferring unit at the selected frequency. In some embodiments, step 710 includes receiving, in the PRU and based on the power status information, a directed power signal from the PTU when the PRU is in proximity of a far range of the PTU. In some embodiments, step 710 includes receiving, in the PRU and based on the power status information, an inductively coupled field from the PTU that is resonant with the PRU, when the PRU is in the proximity of at least a near field range of the power transferring unit. In some embodiments, the inductively coupled field is a RF-modulated magnetic field, and step 710 includes receiving the resonant RF-modulated magnetic field with a receiver circuit in the PRU (e.g., Rx resonator 160r, see FIG. 2). In some embodiments, step 710 includes receiving, in a wireless receiver, multiple wireless signals operating at multiple frequencies, and tuning the at least one power receiving circuit at a frequency of one of the wireless signals.

Step 712 includes converting, with a rectifier circuit, the oscillating power signal from the PTU at the selected frequency into a direct-current signal. In some embodiments, step 712 includes tuning a radio-frequency amplifier circuit coupled to the first antenna at the selected frequency in the power receiving unit. In some embodiments, step 712 includes balancing a differential input from the first antenna. In some embodiments, step 712 includes converting, in a rectifier circuit, one of multiple wireless signals into the direct-current signal.

Step 714 includes providing the direct-current signal to a device load. In some embodiments, step 714 includes receiving, in a reserve battery, at least a first portion of the direct-current signal, and providing at least a second portion of the direct-current signal from the reserve battery to a mobile electronic device docked in the power receiving unit.

The foregoing detailed description has set forth various embodiments of devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), General Purpose Processors (GPPs), Microcontroller Units (MCUs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure.

In addition, those skilled in the art will appreciate that the mechanisms of some of the subject matter described herein may be capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium, e.g., a fiber optic cable, a waveguide, a wired communication link, a wireless communication link (e.g., transmitter, receiver, transmission logic, reception logic, etc.).

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

As mentioned above, other embodiments and configurations may be devised without departing from the spirit of the disclosure and the scope of the appended claims.

The term "machine-readable storage medium" or "computer readable medium" as used herein refers to any medium or media that participates in providing instructions or data to processor for execution. Such a medium may take many forms, including, but not limited to, non-volatile media, volatile media, and transmission media. Non-volatile media include, for example, optical disks, magnetic disks, or flash memory (e.g., memory 155). Volatile media include dynamic memory (e.g., memory 155). Transmission media include coaxial cables, copper wire, and fiber optics, including the wires that comprise a bus. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some," refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

The invention claimed is:

1. A device comprising:
   a processor configured to identify a power transferring device, to determine a range configuration relative to the power transferring device, and to determine a power status of the device;
   a first antenna configured to receive an oscillating power signal from the power transferring device at a first selected frequency based on the range configuration relative to the power transferring device, and based on the power status of the device; and
   a first rectifier circuit configured to convert the oscillating power signal from the first antenna at the first selected frequency into a direct-current signal to charge a device load.

2. The device of claim 1, further comprising a second antenna configured to receive
   an inductively coupled magnetic power signal from the power transferring device at a second selected frequency when the processor determines a near field range configuration relative to the power transferring device and a power level lower than a threshold as the power status of the device.

3. The device of claim 1, wherein the first rectifier circuit comprises a balancing circuit configured to receive a differential input from the oscillating power signal from the first antenna.

4. The device of claim 1, further comprising a switch to transmit the direct-current signal to an external device or to a battery.

5. The device of claim 1, wherein the first antenna is configured to detect multiple wireless signals operating at multiple frequencies, the processor further configured to tune the first antenna at a frequency of one of the multiple wireless signals and to cause the first rectifier circuit to convert the one of the wireless signals into the direct-current signal.

6. The device of claim 1, further comprising a power protection circuit configured to determine a fault condition in the direct-current signal, the fault condition comprising one of an over voltage condition, an over charge condition, and an over temperature condition.

7. The device of claim 1, further comprising an amplifier circuit configured to amplify the oscillating power signal from the first antenna and provide an amplified oscillating signal to the first rectifier circuit.

8. The device of claim 1, wherein the first rectifier circuit comprises a matching circuit configured to balance a differential coupling of the first antenna to provide the direct-current signal to the device load.

9. The device of claim 1, wherein the first rectifier circuit comprises a radio-frequency shield to prevent a harmonic re-radiation of the oscillating power signal.

10. The device of claim 1, wherein the oscillating power signal has a bandwidth and the first rectifier circuit is configured to convert a first portion of the oscillating power signal within a first portion of the bandwidth to charge a first device load and a second portion of the oscillating power signal within a second portion of the bandwidth to charge a second device load.

11. A method of charging a mobile electronic device, comprising:
    identifying, by a power receiving unit, a power transferring unit in a proximity of the power receiving unit;
    determining a range configuration between the power transferring unit and the power receiving unit;
    determining a power status of the power receiving unit;
    selecting a first antenna in the power receiving unit based on the range configuration between the power transferring unit and the power receiving unit, and on the power status of the power receiving circuit;
    receiving, with the first antenna, an oscillating power signal from the power transferring unit at a selected frequency;
    converting the oscillating power signal from the power transferring unit at the selected frequency into a direct-current signal; and
    providing the direct-current signal to a device load.

12. The method of claim 11, wherein converting the oscillating power signal from the power transferring unit at the selected frequency into a direct-current signal comprises balancing a differential input from the first antenna.

13. The method of claim 11, wherein receiving, with the first antenna, an oscillating power signal from the power transferring unit comprises tuning a radio-frequency amplifier circuit coupled to the first antenna at the selected frequency in the power receiving unit.

14. The method of claim 11, wherein selecting a first antenna in the power receiving unit comprises selecting a radio-frequency antenna to receive a directed radio-frequency power when the range configuration between the power transferring unit and the power receiving unit is within a far field, and selecting an inductively coupled antenna when the range configuration between the power transferring unit and the power receiving unit is within a near field.

15. The method of claim 11, wherein selecting the first antenna in the power receiving unit comprises selecting a radio-frequency antenna configured to receive a propagating, directed radio-frequency signal as the oscillating power signal when the range configuration between the power transferring unit and the power receiving unit is beyond a near field configuration and within a far field configuration.

16. The method of claim 11, wherein selecting the first antenna in the power receiving unit comprises simultaneously selecting a radio-frequency antenna configured to receive a propagating, directed radio-frequency signal and an inductively coupled antenna, when the range configuration between the power transferring unit and the power receiving unit is within a near field configuration.

17. The method of claim 11, further comprising receiving, in a reserve battery, at least a first portion of the direct-current signal, and providing at least a second portion of the direct-current signal from the reserve battery to a mobile electronic device docked in the power receiving unit.

18. The method of claim 11, further comprising:
    receiving, in a wireless receiver, multiple wireless signals operating at multiple frequencies,
    tuning the at least one power receiving circuit at a frequency of one of the wireless signals, and
    converting, in a rectifier circuit, the one of the wireless signals into the direct-current signal.

19. The method of claim 11, further comprising selecting a second antenna in the power receiving unit and receiving, with the second antenna, a second oscillating power signal from the power transferring unit at a second frequency, wherein the second oscillating power signal comprises a propagating, directed radio-frequency signal.

20. A non-transitory, computer readable medium storing instructions which, when executed by a processor in a computer, cause the computer to perform a method comprising:
- identifying, by a power receiving unit, a power transferring unit in a proximity of the power receiving unit;
- determining a range configuration between the power transferring unit and the power receiving unit;
- determining a power status of the power receiving unit;
- selecting a first antenna in the power receiving unit based on the range configuration between the power transferring unit and the power receiving unit, and on the power status of the power receiving circuit;
- receiving, with the first antenna, an oscillating power signal from the power transferring unit at a selected frequency;
- converting the oscillating power signal from the power transferring unit at the selected frequency into a direct-current signal; and
- providing the direct-current signal to a device load.

* * * * *